Feb. 6, 1968   J. C. FREYBURGER   3,367,260
DEVICE FOR THE INDUSTRIAL FABRICATION OF WAFFLES OR THE LIKE
Filed June 24, 1966   2 Sheets-Sheet 1

Feb. 6, 1968   J. C. FREYBURGER   3,367,260
DEVICE FOR THE INDUSTRIAL FABRICATION OF WAFFLES OR THE LIKE
Filed June 24, 1966   2 Sheets-Sheet 2

United States Patent Office 3,367,260
Patented Feb. 6, 1968

3,367,260
DEVICE FOR THE INDUSTRIAL FABRICATION
OF WAFFLES OR THE LIKE
Jean Claude Freyburger, 16 Rue Mathias Schiff,
Nancy, France
Filed June 24, 1966, Ser. No. 560,293
Claims priority, application France, June 24, 1965,
22,143
4 Claims. (Cl. 99—374)

ABSTRACT OF THE DISCLOSURE

Device for the industrial fabrication of waffles and the like by gas heating in which the molds have room for at least four conventional waffles, an enclave being provided in which are located means for evacuating the burnt gases, there being a gas burner corresponding to each mold and each mold being individually slidable from a forward position in which the mold can be opened for charging and discharging to a rearward cooking position in which the mold is enclosed in an enclosure above the burner.

---

The invention has for object an improved device for the industrial fabrication of waffles or the like by gas heating.

There are known devices which are used for the industrial manufacture of waffles, for example in fairs, in public parks, etc. However, these devices remain of very ancient design and their operation is far from having a sufficient yield. Moreover they take up a lot of space and require a relatively large personnel. When heating is effected by gas, the waffle irons are made of pig iron; the heavy weight of the pig iron does not permit the making of more than two waffles with one mould, the weight of such a mould for two waffles being of the order of 15 to 20 kilograms. The waffles having to be turned over to be heated on both surfaces, there results a considerable physical effort for the workers with low efficiency. Moreover, the thermal yield is also mediocre, the heat losses being numerous and the burners not using modern techniques.

Also known are certain waffle making devices using electric heat which also do not make more than two waffles per mould while using an expensive heat source which is not available everywhere.

The invention proposes to provide a new device for the industrial fabrication of waffles or the like which is lighter than the devices known, of small bulk and of highly improved efficiency.

The invention is characterised in that the moulds are made of aluminum or of an alloy of aluminum and of dimensions such that they can contain from four to six waffles.

The invention is furthermore characterised in that the moulds, in their heating position, are enclosed in a space in which are provided means for evacuating the burnt gases.

The invention is also characterised by the fact that there is provided in the charge-discharge position of the moulds, means blocking the said space.

The invention is also characterised by the fact that there is provided means for maintaining parallel the two halves of the mould during the swelling of the waffle dough.

The invention will be better understood by referring to the following description made by way of non-limiting example with reference to the annexed drawing in which.

Figure 1:
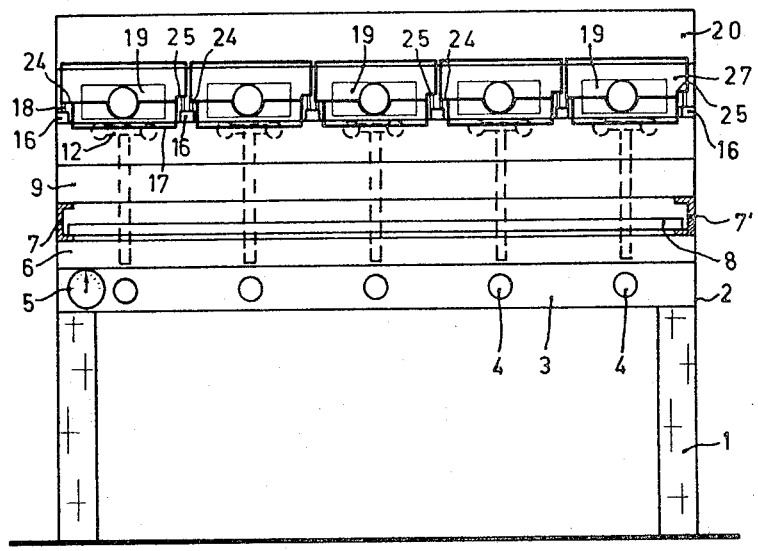
FIGURE 1 is a schematic front view of the device according to the invention, certain elements having been omitted.
Figure 2:
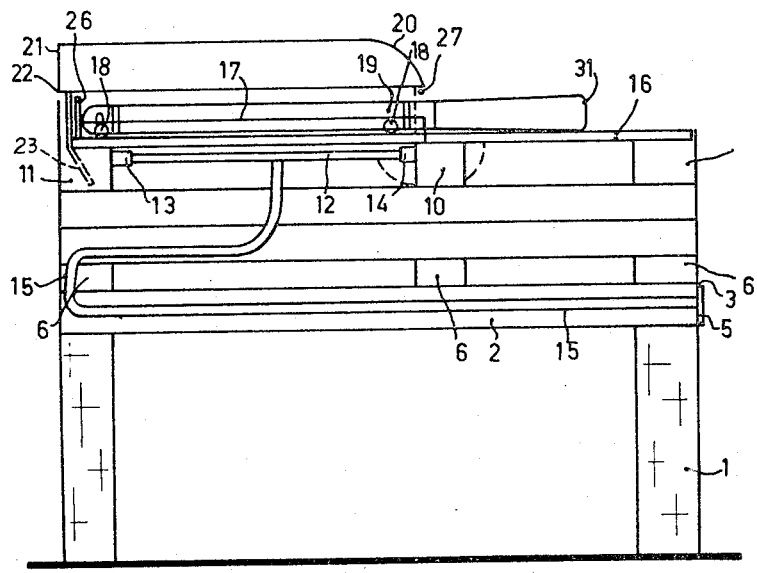
FIGURE 2 is a schematic side elevational view thereof with certain elements not represented.

Referring to FIGURES 1 and 2, the device according to the invention comprises a carrier frame 1, made in any suitable manner. Frame 1 can be conceived in such a way as to house drawers, shelves, etc. The frame 1 terminates in its upper part with a frame 2 the forward part of which 3 houses the control buttons 4 of the gas burners, as well as other instruments, for example a pressure gauge 5.

Frame 2 is surmounted by transversal beams 6 which themselves bear U-shaped irons 7 and 7' disposed longitudinally toward the outside of the device. The U-shaped irons 7 and 7' serve to slide and maintain a sheet metal plate 8 which serves as inner plate to the cooking oven and collects the eventual fall out of dough, grease, etc.

The U-shaped irons 7 and 7' support transverse a forward beam 9, a middle beam 10 and a rear beam 11. The beams 10 and 11 are designed to serve as supports for the gas burners 12 used; the burners 12 are longitudinal and occupy a part of the length between beams 10 and 11, so as not to cover the rear part of the waffle iron. To beam 10 is welded member 13 formed by a small length of metallic section having a side very slightly greater than that of burner 12. To beam 11 is welded a member 14 formed of a semi-profiled metallic section cut along its diameter lengthwise, the openings being upwardly directed. The burner 12 is inserted in member 13 and its other end is placed on member 14.

Burner 12 is fed with gas by tube 15 passing under the sheet metal plate 8; the heat radiated by plate 8 produces a pre-heating of the gas circulating in tubes 15 and there is thus obtained an improved combustion. The gas can be butane gas stored in cylinders (not shown), connected to the control buttons 4 by tubes (not shown), with the interposition of reduction valves, pressure gauges, etc. The gas can also be propane, cooking gas or any other suitable combustible.

Beams 9, 10 and 11 bear rails 16 the number of which is equal to the number of waffle irons plus one. In the embodiment shown, there are used 5 moulds, and therefore six rails being formed by beams having a rectangular or square cross-section.

Rails 16 serve as rolling tracks for frames 17 provided with side-wheels 18. Frames 17 rotatably support, in known manner, waffle irons 19. The assembly of the device has a total length substantially equal to twice the length of the mould and its support; the mould thus can assume two positions, a first position, forward, where it can be discharged or recharged, and a second position, rearwards, above burners 12, which is its cooking position. The back part of the device is surmounted by a cover 20, for example of a steel sheet covered at its interior by an insulating material such as glass wool. The cover 20 thus defines, with plate 8, a cooking oven.

The rear wall 21 of the hood 20 has an opening 22, which in combination with a deflector 23, forms an exhaust chimney 4, for the gases burned by burners 12.

The frames 17 have horizontal walls 24 and 25 shifted in height in such a way as to permit the straddling with the adjacent frame. Moreover, at the rear end of each frame 17 is secured a deflector, simply formed by a sheet of metallic material secured by any suitable means. In the charge-discharge position of the mould, the deflector 26 ensures the closure of the front window 27 of hood 20; there is thus avoided considerable heat losses during the operations of charging and discharging.

Figure 3:
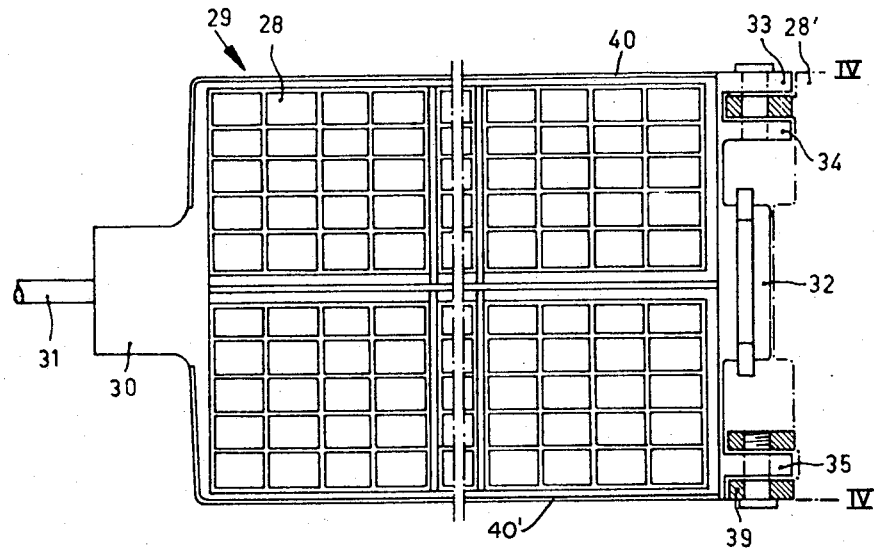
FIGURE 3 is a plan view of an open mould according to the invention.
Figure 4:
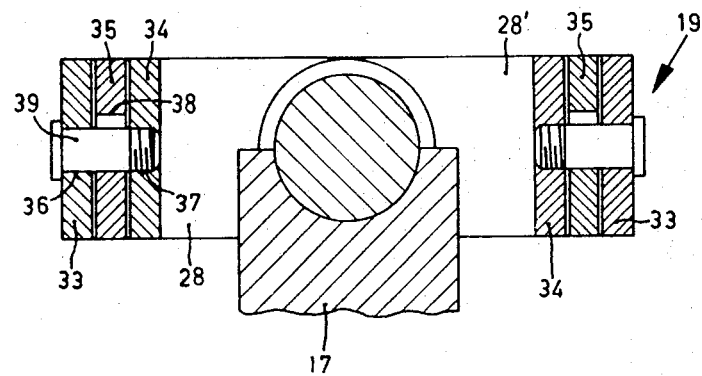
FIGURE 4 is a cross-section along the line IV—IV of FIGURE 3.

The waffle iron 19 has been shown in greater detail on FIGURES 3 and 4.

A mould 19 is composed of two identical plates 28 and 28'. According to the invention, the plates 28 and 28' are in aluminum or in aluminum alloy, for example moulded. Each plate has on its inner face 29 a design intended for the moulding of waffles and which may comprise four fixed rectangles of the size of conventional waffles or a greater number of waffles of smaller dimensions. Plate 28 comprises on its forward end a semi-circular aumgented thickness 30 having a handle 31. Handle 31 can be made of steel, screwed on the augmented thickness 30, the parts grasped by the user being covered with a thermal insulator. The two augmented thicknesses 30 borne by plates 28 and 28' form in the closed position of the mould, a cylindrical shoulder of rotation of mould 19 on its frame 17. Handles 31, borne by plates 28 and 28', constitute then a handle which is almost closed and facilitates the grasping for turning the mould 19.

Plate 28 has on its rear extremity, an augmented thickness 32, playing, as well as augmented thickness 30, the role of support for the mould on the frames 17. Moreover, plate 28 has three hinges 33, 34 and 35. Hinges 33 and 34 are in the vicinity of one another and cooperate with hinges 35 of plate 28'. Hinges 33, 34 and 35 are perforated by a bore 36, 37 and 37 respectively which permits the passage of a shaft 39, which can for example, be screwed into bore 37 of hinge 34 which has a thread for this purpose. The bore 38 of hinge 35 is of oval shape, in such a way as to permit a separation of plates 28 and 29 one from the other, during the swelling of the waffle dough. There is thus obtained a uniform thickness of the waffles, the swollen dough ensuring the parallel relationship of plates 28 and 28'.

According to an important characteristic of the invention, each plate 28 has on its periphery a perpendicular flange 40 running from the area of hinge 33 up to the augmented thickness 30. When the two plates 28 and 28' are closed in heating position, the flanges 40 and 40' ensure a complete closing of the periphery of the mould, which avoids losses of dough which might run at the beginning of the cooking.

The device according to the invention is completed by seals (not shown) covering the side walls in such a way as to complete the closing of the back part forming the oven and for producing a pleasing esthetic appearance.

It is understood that the different parts of the device which have been described as being unitary as an example, can be separated. In particular, the oven itself can be secured removably on the supporting frame.

Although the invention has been described with respect to one embodiment by way of example, it will be understood that there may be brought thereto various modifications without departing from the spirit and scope of the invention. In particular, the number of moulds can be greater or less than four; the apparatus may be made portable by providing it for example with wheels.

What is claimed is:
1. Apparatus for the industrial fabrication of waffles comprising:
   (i) a plurality of moulds made of aluminum alloy for receiving waffle dough, each mould having room for at least four conventional waffles, and comprising two plates pivotally connected together and lying one on top of the other, the upper plate being provided with a handle for separating the plates to open the mould,
   (ii) a gas burner corresponding to each mould for heating said mould,
   (iii) said apparatus including an enclosure above said burner each mould being individually slidable from a forward position in which the mould can be opened for charging and discharging, to a rearward cooking position in which the mould is enclosed in said enclosure above the burner,
   (iv) means being provided for the exhaust of burnt gases from the enclosure during cooking,
   (v) and a deflector to close the enclosure when the mould is in its forward position.

2. Apparatus according to claim 1 in which a plate is disposed below the burners, and a gas pipe for bringing gas to the burners is disposed under said plate whereby the heat radiated by the plate during cooking preheats the gas.

3. Apparatus according to claim 1 in which the pivotal connection between said two plates of the mould comprises a rod provided on one of said plates and a slot provided in the other of said plates, the rod passing freely through the slot, the slot being higher than the thickness of the rod so that said two plates can move apart at their pivoted portions during cooking of a waffle.

4. Apparatus according to claim 1 in which means are provided for completely closing the periphery of the mould while in the cooking position.

References Cited

UNITED STATES PATENTS

| | | | |
|---|---|---|---|
| 270,659 | 1/1883 | Griswold et al. | 99—374 |
| 965,559 | 7/1910 | Blomskog | 126—339 |
| 1,143,603 | 6/1915 | Aaron | 99—377 |
| 1,292,658 | 1/1919 | Smith | 99—374 XR |
| 1,528,050 | 3/1925 | Forshee | 99—374 XR |
| 1,729,552 | 9/1929 | Shadley et al. | |
| 1,795,710 | 3/1931 | Clark | 99—379 |
| 2,376,585 | 5/1945 | Dickey | 99—374 XR |
| 2,743,665 | 5/1956 | Gustafson. | |

BILLY J. WILHITE, *Primary Examiner.*